United States Patent Office 3,506,052
Patented Apr. 14, 1970

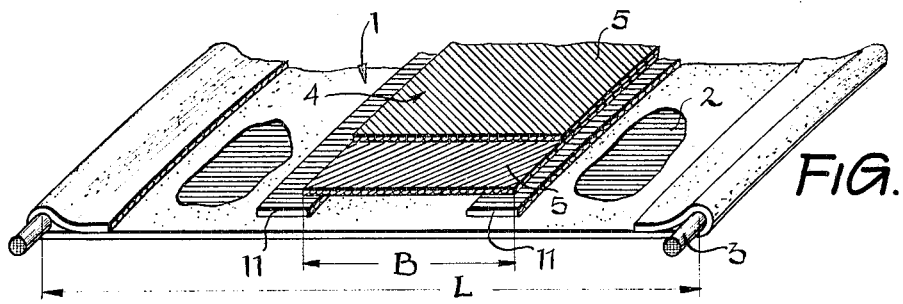
FIG. 1
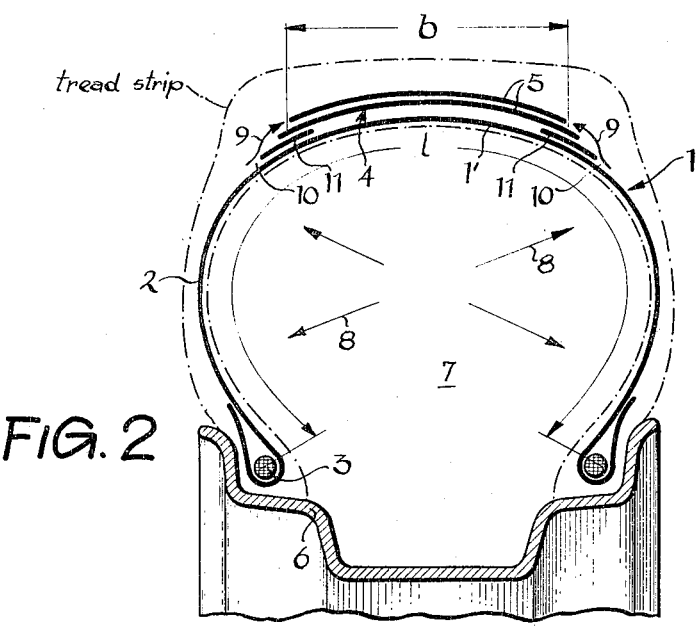
FIG. 2
FIG. 3        FIG. 4        FIG. 5
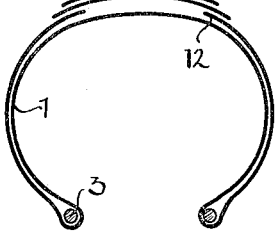 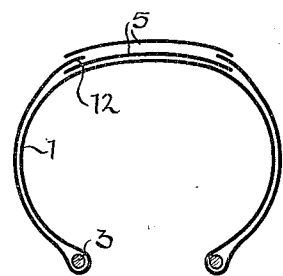 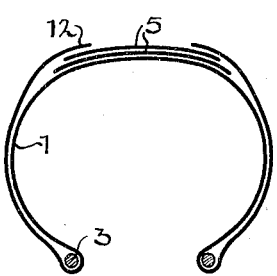

3,506,052
PNEUMATIC VEHICLE TIRE
Hermann Wittneben, Hannover, Germany, assignor to Continental Gummi-Werke Aktiengesellschaft, Hannover, Germany
Filed May 29, 1967, Ser. No. 641,911
Claims priority, application Germany, June 1, 1966, C 39,227
Int. Cl. B60c *9/18*
U.S. Cl. 152—361          7 Claims

ABSTRACT OF THE DISCLOSURE

A pneumatic vehicle tire with a pull resistant belt for lateral stabilization of the tire and with a carcass having pull resistant reinforcing inserts extending from bead to bead and being looped therearound while at least approximately extending at a right angle with regard to the circumferential direction of the tire, those sections of said carcass reinforcing inserts which face said belt being free from pulling stresses in the inflated condition of said tire. The tire according to the present invention is characterized primarily in that additional thread shaped reinforcing inserts are located within the marginal areas only of said belt and extend at least approximately at a right angle with regard to the circumferential direction of the tire.

---

The present invention relates to a pneumatic vehicle tire with a pull-resistant belt for lateral stabilization and with a carcass of thread-shaped reinforcing inserts extending at a right or approximately right angle with regard to the circumferential direction of the tire while said thread-shaped reinforcing inserts extend from bead to bead.

In my copending application Ser. No. 599,850 filed Dec. 7, 1966, there is described a pneumatic tire of the above mentioned general type, according to which by a special design of the carcass the belt is so influenced that it will be able to absorb relatively large forces necessary for obtaining an increased lateral stabilization. Accordingly, those sections of the strength carriers which face the belt and form the carcass are in inflated condition of the tire not under pulling tension while preferably the above mentioned sections of the carcass are even upset with the tire in operation. In particular, the said sections are upset by 20 to 50% with regard to their original length prior to building up the tire therefrom.

This design of the carcass brings about that the forces produced by the tire inner pressure are conveyed through the lateral sections of the carcass, which are adjacent to the belt, to the belt. The belt is thus subjected to a correspondingly large pulling prestress in the transverse direction of the tire which prestress brings about a further consolidation or strengthening of the belt and thereby a considerable increase in the lateral stabilization of the tire.

It is an object of the present invention by means of additional thread-shaped reinforcing inserts to see to it that strengthwise a good satisfactory transition will occur between the lateral carcass sections on one hand and the marginal portions of the belt on the other hand.

It is a further object of this invention to provide a tire as set forth in the preceding paragraph, in which below the marginal portions of the belt there will be formed carcass sections which will be adapted to convey great forces and which are not without tension but will be upset only to such a minor extent that the above mentioned forces can be safely transmitted.

These and other objects and advantages of the invention will appear more clearly from the following specification in connection with the accompanying drawing, in which:

FIG. 1 diagrammatically illustrates a partial section through a raw tire produced according to the flat band method.

FIG. 2 is a diagrammatic illustration of a partial section of a pneumatic tire which is made from the raw tire of FIG. 1 and which is under operative pressure.

FIGS. 3 to 5 respectively illustrate partial sections through modified pneumatic vehicle tires according to the present invention.

The pneumatic tire according to the present invention is characterized primarily in that within the range of the marginal portions of the belt there are provided additional thread-shaped reinforcing inserts which extend over a small portion only of the width of the belt, said thread-shaped reinforcing inserts preferably extending at a right or practically right angle with regard to the circumferential direction of the tire.

Tires of this type are produced according to the flat band method, and the raw tire is in practically hollow cylindrical shape provided with carcass threads of such a length that the length of the carcass threads is greater than the length of said threads in the vulcanized condition of the tire. By curving the raw tire and by the reduction in the width of the belt inherent to such curving operation, the carcass threads located directly adjacent to the belt are so influenced that in inflated condition of the tire the last mentioned carcass threads are either under no tension or are even upset. If now, in conformity with the present invention, within the range of the marginal areas of the belt additional thread-shaped reinforcing inserts are provided the extension of which corresponds to the carcass threads, it will be appreciated that when the raw tire is being curved, the said additional threads will impede the reduction in width of the marginal portions of the belt and/or will reduce the influence of the carcass threads below the marginal portions of the belt.

In this way, the sections of the carcass threads which are below the marginal areas of the belt will be able to a satisfactory extent to take part in the transfer of the forces from the carcass to the belt, whereas those thread sections of the carcass which are located in the central portion of the thread strip zone below the belt will be under no tension or will be upset to the above mentioned extent.

Referring now to the drawing in detail, the tire carcass 1 shown therein comprises primarily pull-resistant thread-shaped reinforcing inserts 2 which extend substantially at a right angle with regard to the circumferential direction of the tire and by being looped around the bead cores 3 are fixedly anchored thereon and extend without interruption from bead to bead. The belt 4 extends around the carcass 1 in the form of an annular band having a flat rectangular cross section. The belt comprises two or more layers 5 of pull-resistant threads, ropes, wires, cables, or the like, which are parallel to each other and which with the raw tire shown in FIG. 1 form an angle of approximately 40 to 50° with the circumferential direction of the tire. The threads or the like of one layer cross the threads or the like of the adjacent layer in a manner known per se and in symmetric arrangement with regard to the circumferential direction of the tire.

FIG. 2 shows a pneumatic tire made from the tire shown in FIG. 1 mounted on a rim 6. The hollow chamber 7 of the tire is under an overpressure, for instance a pressure of two atmospheres above atmospheric pressure. The geometric length of the reinforcing inserts 2 forming the carcass 1 is designated with the letter *l*.

When building up the raw tire in conformity with FIG. 1, that portion of the carcass 1 or that portion of the reinforcing inserts 2 forming the carcass, which is located between the bead cores 3 will have a length L which is greater than the length $l$ according to FIG. 2.

Below the marginal portions of the layers 5 there is provided a cord fabric strip 11 the threads of which extend at a right angle with regard to the circumferential direction of the tire. The cord fabric strip 11, however, extends only to such an extent below the layers 5 that between the strips 11 in the direction of width of the tire there will remain a space which is only slightly less than the width of the layers 5 forming the belt 4.

During the manufacture of the tire, the raw tire according to FIG. 1 will when being curved into the tire of FIG. 2 undergo a reduction in diameter. The diameter of the belt will be considerably increased while the angle of the threads or the like forming the layers 5 will be reduced and will assume a value of approximately 15 to 20° with regard to the circumferential direction of the tire. With this increase in diameter, also the width B of the belt 4 is reduced by approximately 50% to the value $b$. Since the length L is greater than the length $l$, that section 1' of the carcass 1 which is directly adjacent to belt 4 undergoes an upsetting which corresponds substantially to the increase in width of the belt 4 or is dependent on this decrease in width. In view of the cord fabric strip 11, however, the belt 4 cannot over its entire width influence the reinforcing inserts 2 of the carcass which are directly adjacent to the belt. The interposed cord fabric strips 11 act so to speak as upsetting brake within the range below the marginal portions of the belt.

If now with the finished tire the tire hollow chamber 7 is subjected to pressure, the section 1' of the carcass 1 between the cord fabric strips 11 will be without tension or will be upset. The forces 8 originating from the tire inner pressure will thus be transferred not via the section 1' but through the cord fabric strips 11 onto the belt 4. The power flow is shown by the arrows 9. The transverse tension of belt 4 produced in this way will bring about that the belt 4 will during driving through a curve or the like be able to exert correspondingly high reaction forces against the lateral forces occurring when driving through a curve. Therefore, in view of the effect of the lateral forces, the transverse transformation of the running strip zone will be less while the interposed cord fabric strips 11 will bring about a strengthwise favorable transition between the carcass 1 and the belt 4.

Even though for purposes of influencing the reinforcing inserts 2 of carcass 1 the relatively narrow cord fabric strips 11 will be sufficient, it is advantageous for purposes of production simplification and for increasing the strength of the tire side walls, to extend the ends of the reinforcing inserts 2 which are looped around the bead cores 3 up to the marginal portions of the belt 4 as shown in FIGS. 3 to 5. The free marginal portion 12 of the carcass 1 may, similar to FIGS. 1 and 2, be passed below the belt 4. However, it is also possible to pass the free ends 12 between the belt layers 5 or by means of said ends to cover the marginal portions of the belt layers 5 as shown in FIG. 5. In this connection it is to be understood that the desired influencing of those sections of the reinforcing inserts 2 which are surrounded by the belt 4 will be the greater the closer the free ends 12 are arranged with regard to that portion of the carcass 1 which leads from bead to bead. The said influencing is also greater with the embodiments of FIGS. 1, 2 and 3 than with the embodiments of FIGS. 4 and 5.

As is generally customary in the pneumatic tire building industry, all reinforcing inserts of the tire are vulcanized on, and the transfer of the forces, particularly in the sense of the arrow 9, is effected through a vulcanized-on-rubber layer between adjacent threads, cables, wires, or the like.

It is, of course, to be understood that the present invention is, by no means, limited to the particular embodiments shown in the drawing but also comprises any modifications within the scope of the invention.

It is furthermore to be understood that the term threads as it appears in the specification and claims not only covers threads, but also wires, cables, ropes, and the like.

What I claim is:

1. A pneumatic vehicle tire with a tread strip and with beads and a carcass having pull resistant reinforcing insert means extending from bead to bead and looped therearound while extending at least approximately at a right angle with regard to the circumferential direction of the tire, which includes in combination a pull resistant belt for lateral stabilization of the tire, said belt being located radially inwardly of said tread strip and between the latter and said carcass while being approximately coextensive in width with said tread strip, and additional pull resistant reinforcing insert means including threads and being arranged within the marginal areas only of said belt, those sections of the carcass forming pull resistant tensile-stress-free reinforcing insert means consisting of upset threads which face said belt and being free from pulling tensions in inflated condition of the tire.

2. A pneumatic vehicle tire in combination according to claim 1, in which said threads of said additional pull resistant reinforcing insert means upset 20%–50% lengthwise extend at least approximately at a right angle and transversely with regard to the circumferential direction of the tire.

3. A pneumatic vehicle tire in combination according to claim 1, in which the threads of said additional pull resistant reinforcing insert means are formed by said free end portions of the carcass reinforcing insert means upset 20%–50% lengthwise extending directly transversely from bead to bead and looped therearound.

4. A pneumatic vehicle tire in combination according to claim 1, in which said upset threads of said additional reinforcing insert means lengthwise are located inwardly directly in between said carcass and said belt.

5. A pneumatic vehicle tire in combination according to claim 3, in which the free end portions of said carcass reinforcing insert means which form said upset threads of said additional reinforcing insert means lengthwise are located inwardly directly in between said belt and other portions of said carcass reinforcing insert means.

6. A pneumatic vehicle tire in combination according to claim 3, in which said belt comprises a plurality of layers, and in which the free end portions of the carcass reinforcing means which form said upset threads of said additional reinforcing insert means lengthwise are located inwardly directly in between said layers of said belt.

7. A pneumatic vehicle tire in combination according to claim 3, in which the free end portions on the carcass reinforcing insert means which form said upset threads of said additional reinforcing insert means lengthwise are located inwardly directly in between said belt and said tread strip.

References Cited

UNITED STATES PATENTS

| 2,493,614 | 1/1950 | Bourdon | 152—361 |
| 3,058,509 | 10/1962 | Maiocchi | 152—361 |
| 3,085,616 | 4/1963 | Smith et al. | 152—361 |
| 3,195,604 | 7/1965 | Boussu et al. | 152—361 |

FOREIGN PATENTS

| 1,187,693 | 9/1959 | France. |
| 1,437,569 | 3/1966 | France. |

ARTHUR L. LA POINT, Primary Examiner

C. B. LYON, Assistant Examiner